Oct. 17, 1961 B. E. PREVOST 3,004,724
JORDAN PLUG
Filed Nov. 3, 1958
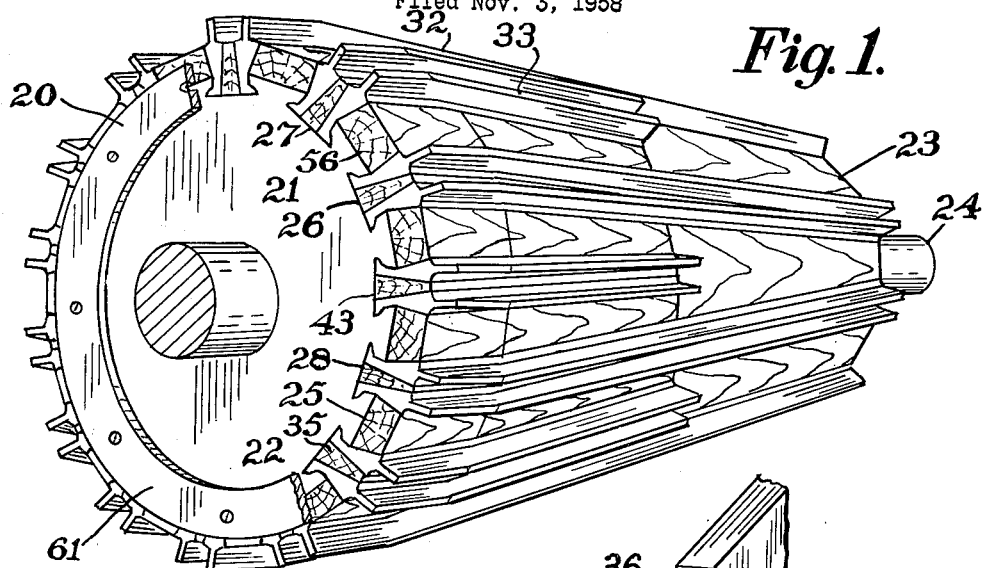
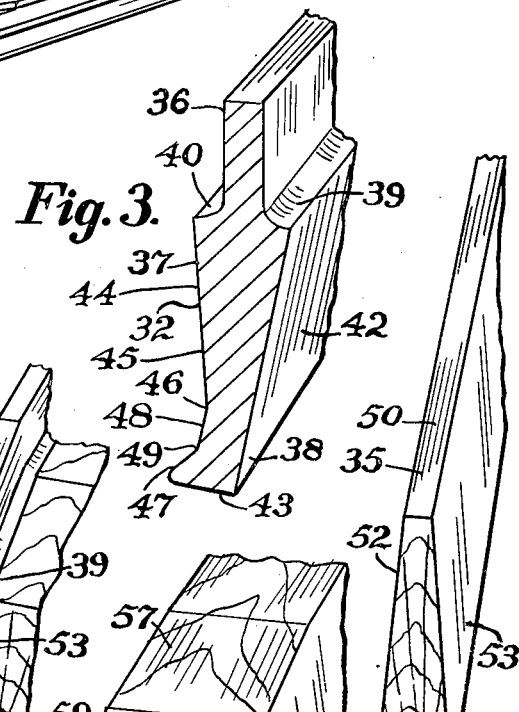
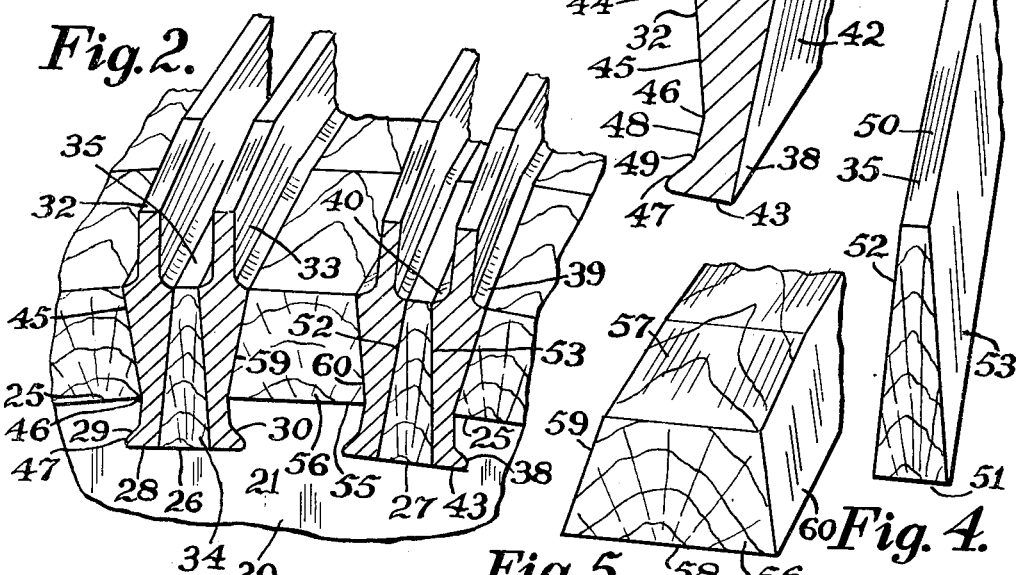
INVENTOR.
BRUNO E. PREVOST
BY
Pearson + Pearson
ATTORNEYS United States Patent Office 3,004,724
Patented Oct. 17, 1961

3,004,724
JORDAN PLUG
Bruno E. Prevost, West Boxford, Mass., assignor to John W. Bolton & Sons, Inc., Lawrence, Mass., a corporation of Massachusetts
Filed Nov. 3, 1958, Ser. No. 771,305
4 Claims. (Cl. 241—294)

This invention relates to an improved plug for a rotary refiner of the undercut, or dovetailed, grooved type.

It has long been customary to construct the frustro conical plugs of rotary refiners, such as Jordan engines, with single longitudinally extending bars, or knives, each arranged in an undercut slot in the surface of the plug body. As illustrated in U.S. Patent 1,829,630 to Bolton of October 27, 1931, and U.S. Patent 1,780,863 to Buehler of November 4, 1930, the bars have been provided with enlarged base portions endwise slidable in inverted T shaped grooves or generally dovetail grooves or as illustrated in U.S. Patent 2,366,367 to Stuck of January 2, 1945, a filler has been used to lock a bar of rectangular cross section in a dovetail groove.

It has also long been known to provide wide undercut grooves in the body of a refiner plug and to arrange two or more bars in the same with an expandable filler therebetween. As shown in U.S. Patent 727,176 to Mills of May 5, 1903, and U.S. Patent 2,709,396 to Bridge of May 31, 1955, the filler, or multiple fillers, between each bar in the groove has been of rectangular cross section and inserted from a radial direction by hammering or the like.

The device of this invention is of the type wherein the plug body grooves are relatively wide and undercut with a pair of bars and a filler arranged in each groove. It seeks to overcome certain disadvantages in locking the bars in the groove by radial hammering and especially the difficulty sometimes encountered in removing the bars when worn. It has been the custom in the art to chip out the fillers, piece by piece, since upon swelling they are firmly adhered to the bars and the bars are locked in the groove. The removal operation is especially time consuming when fillers of synthetic material are used or when the filler has expanded into a groove in the bar, expanded around a rib in the bar, or has been split at its base to diverge laterally.

The object of this invention is to provide a grooved, or slotted, plug for a rotary refiner wherein a pair of bars are initially locked in each undercut groove entirely by the keystone action of a narrow filler of inverted keystone cross section inserted endwise between the bars and extending from the base of the groove to the height of inside shoulders on the bars. The expansion of the filler, when the plug is later exposed to liquid, serves to supplement the initial locking action with an entirely circumferential pressure, the bar being unable to move radially in either direction because it is immovably seated in the undercut groove.

Another object of the invention is to provide a pair of bars in each undercut groove of a Jordan plug and a single narrow expandable filler of uniform keystone shape cross section between the bars, the thick base of the filler locking the bars in the groove during use but the entire filler, including the thin, separator portion outside the groove, being slidable endwise from between the bars for replacement of the lining.

A further object of the invention is to provide an undercut grooved plug with a pair of bars separated by an expandable filler for each groove, the bars and filler being slidably insertable and removable endwise of the grooves but locked against radial movement therein, the expansion of the filler being balanced by the expansion of similar fillers between each pair of bars, and outside of said grooves.

Other objects and advantages of the invention will be apparent from the claims, the description of the drawing and from the drawing in which—

FIG. 1 is a perspective view of the plug of a rotary refiner constructed in accordance with the invention, FIG. 2 is a fragmentary, enlarged end view of the bars and fillers of the invention, FIG. 3 is a further enlarged end view of the preferred form of one bar of each pair of bars of the invention, FIG. 4 is a view similar to FIG. 3 of the preferred form of narrow fillers, and FIG. 5 is a view similar to FIG. 3 of the preferred form of wide fillers of the invention.

In the drawing 20 represents a typical frustro conical plug of a rotary refiner, for example, the plug of a Jordan engine. The plug 20 includes the body 21, the large end 22, the small end 23, the shaft 24 and the frustro conical surface 25 of the plug body. As shown, the surface 25 of plug body 21 includes a plurality of angularly, or laterally, spaced, longitudinally extending undercut grooves such as 26 and 27. Preferably the grooves, or slots, 26 and 27 are of dovetail cross section, although it will be apparent that grooves of other cross section would be useful in the structure of this invention, so long as they include a groove bottom 28 and a pair of undercut groove walls such as 29 and 30. As is customary in the Jordan engine art, alternate grooves such as 26 extend the full length of the plug while the grooves such as 27 may extend only from the large end 21 part way along the plug surface 25 for reasons of space.

In each undercut groove 26 or 27 a pair of metal bars such as 32 and 33 are arranged at a spaced distance apart, the space 34 between the bars being occupied by the narrow filler 35 of expandable material such as wood.

The bars 32 and 33 are identical but reversed, or back to back. As shown in FIG. 3, each bar 32 includes an outer portion 36, an intermediate portion 37 and an inner, or base portion 38. The outer portions 36 of each pair of bars 32 and 33 are parallel to each other whether extending the full length of the plug in a long slot 26 or extending for less length in a short slot 27. It is the outer portions 36 of the bars which cooperate with the bars or knives of the Jordan shell to accomplish the refining action. The clearance between the plug and shell knives is critical and since the plug rotates at high speed, the bars thereon must be firmly anchored and capable of no radial movement relative to the plug body which might cause damage to the Jordan linings by jamming and the like.

The intermediate portions 37 of the bars 32 and 33 are enlarged to form an inside shoulder 39 and an outside shoulder 40, the shoulders preferably tapering slightly as shown. A flat, single planar, face 42 converges from the inside shoulder 39 down to the flat bottom face 43 of each bar. A multi-planar or triple planar, face 44 on the outside of each bar includes the face 45 which converges from the outside shoulder 40 to a longitudinal line 46, at the level of the surface 25 of plug body 21, a face 48 extending from line 46 to a longitudinal line 49, and the face 47 which diverges from the line 49 to the flat bottom face 43, of the bar. Thus each bar includes the enlarged lower portions 38 which become firmly anchored by the undercut walls 29 and 30 of the grooves such as 26 and 27 when the plug bars are arranged in the grooves. The face 47 of each bar is slidable flatwise on the undercut walls 29 and 30 and the face 43 of each bar is slidable flatwise on the groove bottom 28 of each groove with the entire area of the faces in mutual engagement for firm anchoring of the bars.

The narrow expandable fillers 35 are preferably of wood, but may be of any suitable expandable material. Each filler 35 is of inverted keystone cross section (FIG. 4) with a flat narrow upper face 50, a flat wider lower face 51 and opposite flat side faces 52 and 53. The fillers 35 are of uniform cross section throughout their length to maintain the bars 32 and 33 in parallelism within their grooves. A pair of bars 32 and 33 with the faces 52 and 53 of a filler 35 in flatwise engagement with the corresponding faces 42 of the bars may be inserted endwise and slidably in a groove 26 or 27 until fully seated within the groove. Upon endwise insertion of each pair of bars 32 and 33 with a narrow filler 35 therebetween into a plug groove, it will be apparent that the inverted keystone cross section of the filler 35 will lock it against radial outward movement relative to the bars and will also lock the bars against radial outward movement relative to the groove.

After installation of the bars 32 and 33 in all of the grooves, the wider expandable fillers 56, which are of wood or other suitable expandable material, are similar, inserted endwise in each space 55 between each pair of bars. Each wider filler 56 includes the flat, upper face 57, the flat lower face 58 and the opposite, flat side faces 59 and 60 and each filler 56 is of inverted keystone cross section. The fillers 56 are tapered lengthwise, however, and are not of uniform cross section. The flat side faces 59 and 60 are slidable flatwise against the corresponding faces 45 of the bars 32 and 33 and the flat lower face 58 is slidable flatwise on the surface 25 of plug body 21, which is usually similarly flattened between the grooves 26 and 27, until the fillers 56 are firmly seated between the pairs of bars.

A ring, such as 61, at the large end 22 and a similar ring at the small end 23 are affixed to plug body 21 to prevent the endwise movement of the bars and fillers, all in a well known manner. Thereafter, the plug assembly is immersed in liquid, such as water, usually within the Jordan plug for a time such as twenty-four hours, to cause the wood fillers to expand. Upon such expansion the bars 32 and 33 are firmly locked against radial movement in either direction.

When it is necessary to remove the bars, due to wear, the end rings 61 are removed and the fillers 56 loosened and then slid endwise out from between the bars. The release of the sidewise pressure of fillers 56, then makes it relatively simple to loosen the fillers 35 and slide them, as well as the bars 32 and 33 endwise out of the grooves.

I claim:

1. A plug for a rotary refiner comprising a plug body having a plurality of angularly spaced, longitudinally extending grooves of dovetail cross section in the surface thereof; a pair of plug bars seated in each said groove, each bar of each pair having an inside and an outside, longitudinal shoulder therealong intermediate of the height thereof, a single planar, inside face converging from the inside shoulder to the bottom of the bar and a multi-planar, outside face including a face converging from the outside shoulder to said plug body surface and a face diverging from proximate said body surface to the bottom of the bar, said divergent face being flatwise against the adjacent dovetail wall of said groove; a single, narrow expandable filler of uniform, inverted keystone cross section seated in each said groove between the adjacent inside faces of the bars in said groove and extending from the groove bottom up to the inside shoulders of said bars, the inverted keystone cross section of said narrow expandable fillers locking the same against radial outward movement relative to said bars and locking said bars against radial outward movement relative to said groove and a wide expandable filler of inverted keystone cross section seated on the surface of said plug body between the adjacent outside faces of each adjacent pair of bars and extending from said body surface up to the outside shoulders of said bars.

2. In a Jordan plug of the undercut groove type, the combination of a pair of parallel plug bars arranged at a spaced distance apart in each said groove, the outer portions of said bars being outside said groove, the intermediate portions of said bars being enlarged to form oppositely disposed longitudinal shoulders, the opposed inside faces of said bars diverging away from each other from said shoulders to the base of said groove and the inner portions of said bars, adjacent the side walls of said groove, being enlarged for sidewise locking thereunder; a single, narrow expandable wood filler of uniform, inverted keystone cross section seated between the bars of each said pair and between said shoulders and the base of said groove for locking said filler against radial outward movement relative to said bars and locking said bars against radial outward movement in said groove and a wide expandable filler of inverted keystone cross section fitted between each adjacent pair of bars between the shoulders thereof and the surface of said plug for maintaining the outer portions of said bars in parallelism.

3. In a plug for a rotary refiner having a frustro conical body with spaced longitudinally extending dovetail grooves, in the surface thereof the combination of a plurality of pairs of bars, each pair arranged in one of said grooves at a spaced distance apart and with the outer portions thereof parallel to each other; a narrow expandable filler of inverted keystone cross section seated in each groove between the bars of each pair, a wide expandable filler of inverted keystone cross section seated on the surface of said body between each adjacent pair of bars, a single planar outwardly divergent face on the inside of each said bar in flatwise engagement with the adjacent face of said narrow filler, and a triple planar face on the outside of each said bar, said triple face including an outwardly convergent portion in flatwise engagement with the adjacent dovetail wall of said groove and an outwardly divergent portion in flatwise engagement with the adjacent face of a wide filler, the inverted keystone cross section of said narrow filler locking the same against radial outward movement relative to said bars prior to expansion thereof.

4. A plug for a rotary refiner comprising a frustro conical plug body having a series of grooves disposed side by side in spaced relationship, the side walls of each groove diverging from the mouth thereof toward the bottom of the groove; a pair of identical blades disposed, in back to back relationship, in each groove with a space therebetween and with their outer portions projecting from the groove, the blades of each pair having opposed, single planar inside faces diverging away from each other from longitudinal, inside shoulders intermediate of said outer portions to the bottom of said groove and having outside multi-planar faces for anchoring said blades in said groove and anchoring wide expandable fillers between each succeeding pair of blades; a single, narrow expandable filler of inverted keystone cross section between the blades of each pair and bridging the space therebetween, each said narrow filler having a relatively thick base portion seated in said groove and a relatively thin portion extending from the mouth of said groove to the inside shoulders of said blades and a wide, expandable filler of inverted keystone cross section seated on the surface of said plug body and extending therefrom to the outside shoulders of said blades between the projecting portions of succeeding pairs of blades, said fillers serving as endwise, slidable separators between the outer portions of said blades outside said grooves for balancing the expansion of said wide fillers and also serving as expansible, endwise slidable, self locking members within said groove for locking said bars against radial outward movement.

References Cited in the file of this patent

UNITED STATES PATENTS

| 341,223 | Clawson | May 4, 1886 |
| 727,176 | Mills | May 5, 1903 |
| 2,758,516 | Prevost et al. | Aug. 14, 1956 |
| 2,862,424 | Jones | Dec. 2, 1958 |